T. B. ATTERBURY.
Mold for and Process of Manufacturing Glass Articles.
No. 159,061. Patented Jan. 26, 1875.
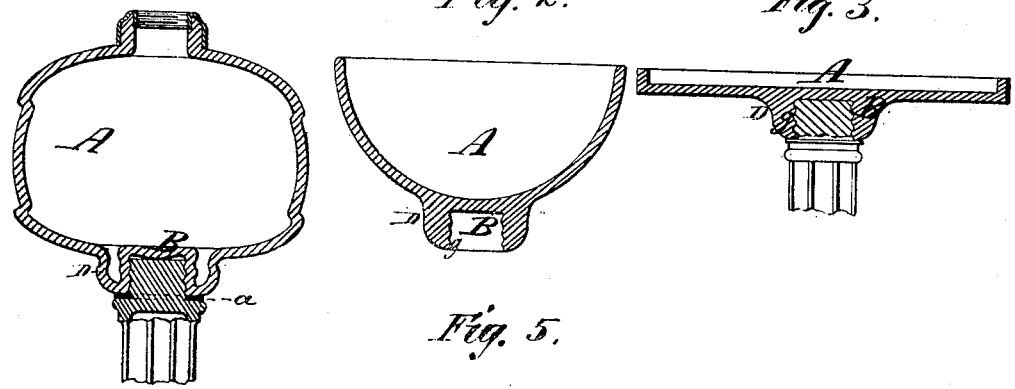
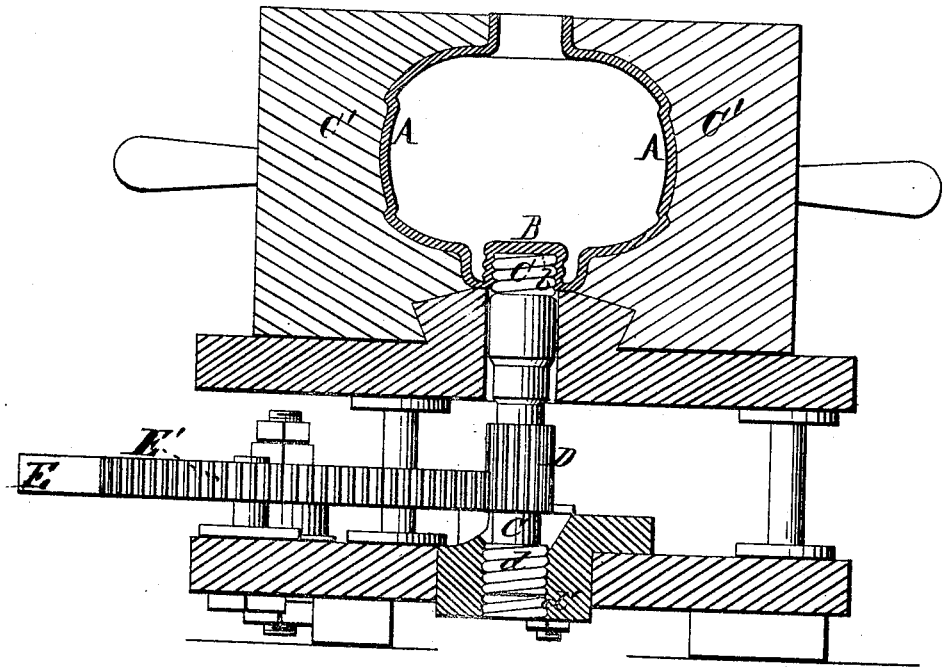
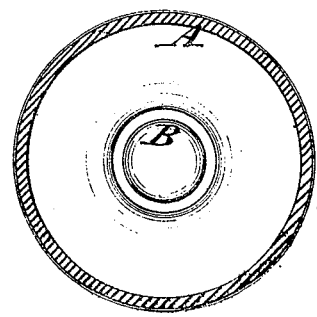
Witnesses:
Inventor:
Thomas B. Atterbury
by
Mason Fenwick & Lawrence
Attys.

UNITED STATES PATENT OFFICE.

THOMAS B. ATTERBURY, OF PITTSBURG, PENNSYLVANIA, ASSIGNOR OF ONE-HALF HIS RIGHT TO JAMES S. ATTERBURY, OF SAME PLACE.

IMPROVEMENT IN MOLDS FOR AND PROCESSES OF MANUFACTURING GLASS ARTICLES.

Specification forming part of Letters Patent No. 159,061, dated January 26, 1875; application filed December 19, 1874.

*To all whom it may concern:*

Be it known that I, THOMAS B. ATTERBURY, of the city of Pittsburg, county of Allegheny and State of Pennsylvania, have invented an Improvement in Molds for, and Process of Making, Fruit-Bowls, Lamp-Bowls, and Salvers, and also in the construction of such glass or vitreous articles; and I do hereby declare that the following is a full, clear, and exact description of the same, reference being had to the accompanying drawings, forming part of this specification, in which—

Figures 1, 2, and 3 are vertical sections of a lamp-bowl, a fruit-bowl, and a salver or cake-stand, made according to my invention. Fig. 4 is a horizontal section of the lamp-bowl. Fig. 5 is a vertical central section of the mold and its connections for making a lamp-bowl.

The invention which I have made obviates much inconvenience and expense experienced heretofore in the manufacture of the glass articles mentioned and shown. As heretofore made, these articles (when their bowls are produced by the blowing process) required the services of two workmen for their production, viz., one to gather up the piece of glass to form the screw-peg and place the same in a socket formed in a vertically-movable screw-threaded section of mold, and another workman to blow the remainder of the article within the mold. In this operation the pressure of the glass being blown comes upon the piece placed in the socket, and causes the said piece of glass, which is hot, to take the impression of the screw-thread in the socket, and also unite with the blown glass.

My present invention does away with the services of the first workman, and enables the blower alone, after he has blown his glass into globe shape, to finish the lamp-bowl or fruit-bowl or salver, as the case may be, within the mold, and with either a seamless screw-threaded or a seamless plain socket in its bottom.

The nature of my invention consists, first, in the mold-section by which the collar and socket are formed; second, in the process; and, third, in the article produced, as herein described and specifically claimed.

In the drawings, A, Figs. 1, 2, and 3, designates a lamp-bowl, a fruit-bowl, and a salver, and B a seamless socket blown in each of these articles. D is a projecting glass collar on the bottom of the lamp-bowl or salver, in which the socket B is formed. The seamless socket receives the upper end of a stand or pedestal, and the projecting glass collar dispenses with the use of the brass collar ordinarily used at the joint between the stand and the bowl. The socket represented has a seamless screw-thread, $g$, blown in it, and when this thread is employed a rubber gasket, $a$, is interposed between the shoulder of the pedestal or stand and the bottom of the glass forming the socket, for the purpose of preventing fracture of the glass when the parts are screwed together. The screw-socket is formed by providing a revolving and vertically-movable screw-threaded section of mold C, and extending its upper end through and beyond the inner surface of the bottom of the ordinary two-part mold C' C'; as shown, and having the blower place his glass, blown in globe form, upon the end $b$, and continue to blow until the article is completed—that is so far as general outline goes. The section C of the mold has a screw, $d$, on its lower end, a screw, $b$, on its upper end, and a long pinion, D, midway between these screws. The screw $d$ works up and down in a female nut, $d'$, which is in the base-piece of the machine. E is a lever, with a toothed sector, E', on one of its arms. The sector gears with the pinion D, and causes it to make several revolutions to the right or left, and the nut $d$ moves it up or down with the mold-section C while it is revolving. By moving the lever in one direction the screw-threaded section of the mold is run upward by the action of the nut $d'$ upon the screw $d$, and by reversing the movement it is run down. If a screw is not required the end $b$ of the section C is made plain on its periphery.

The upper section, C' C', of the mold, may be in form of a fruit or flower bowl, as in Fig. 2; or it may be in form (or nearly so) of the salver or cake-dish, as shown in Fig. 3. This section is operated in the usual manner, and its bottom is shaped to permit the socket B to be formed on the articles.

In making the salver I take the glass article in the form shown in Fig. 2, which is produced by my process, and while hot flare or press it out to the shape shown in Fig. 3.

What I claim is—

1. The vertically-movable mold-section C, having its upper end protruded through and extended up above the bottom of the mold-section, which forms a lamp-bowl, a fruit-bowl, or a salver, so that the blower can blow the glass for forming the collar and socket upon the top and periphery of the exposed portion of the movable section C, substantially as described.

2. The process herein described of making the specified blown-glass articles with seamless sockets in their bottoms, said process consisting in inserting a vertically-movable section of mold through the bottom of a mold for a lamp-bowl, a fruit-bowl, or a salver, and bringing the hot glass in globe form upon the protruding end of the movable section of mold, and continuing the blowing operation until the article with a collar upon and a socket in its bottom is formed, and then moving the movable section down out of the socket, substantially as described.

3. A blown lamp-bowl, a fruit-bowl, or a salver of glass or other vitreous material, constructed with a collar upon and a blown seamless socket, B, in its bottom, substantially as described.

THOS. B. ATTERBURY.

Witnesses:
JNO. P. SCOTT,
WM. J. PATTERSON.